Feb. 28, 1961 S. B. TOBEY 2,973,475
COMPUTER SYSTEM
Filed April 9, 1958
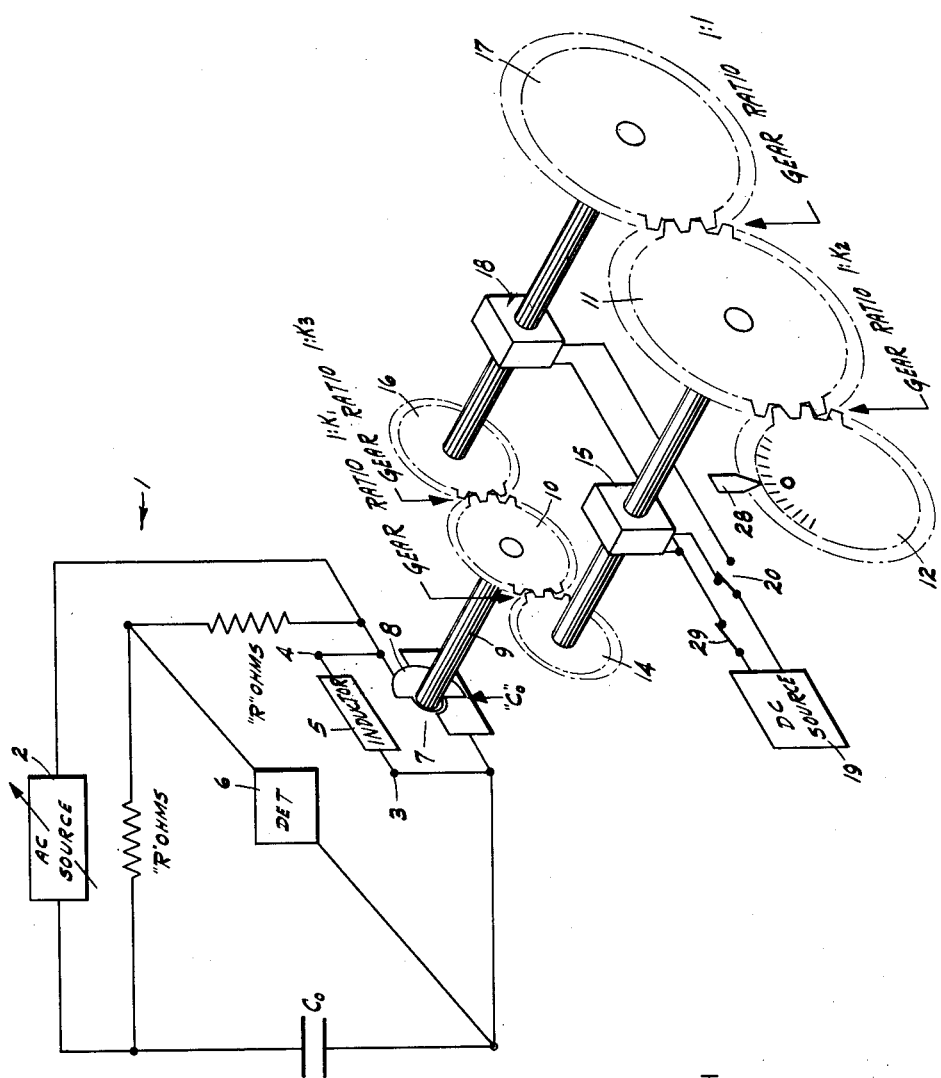
INVENTOR
S. B. TOBEY
By W.C. Parnell
ATTORNEY : 2,973,475
Patented Feb. 28, 1961

2,973,475
COMPUTER SYSTEM

Silas B. Tobey, Westfield, N.J., assignor to Western Electric Company, Incorporated, New York, N.Y., a corporation of New York Filed Apr. 9, 1958, Ser. No. 727,435

3 Claims. (Cl. 324—60)

This invention relates to computer systems and particularly to a system for accumulating and indicating data on a calibrated dial.

In testing the electrical parameters of impedance elements, it is sometimes necessary to subject the elements to two or more different test conditions and then combine the results of the tests in order to properly classify the elements. For example, the usual method of determining the distributed capacitance of an inductor involves resonating the inductor at two different frequencies, by adding external capacitance across the inductor, and then substituting the external resonating capacitance values in a mathematical equation involving at least two different mathematical computations relating each of the capacitance values with the resonating frequencies.

An object of the invention is a computer for accumulating the results of a series of different mathematical computations.

Another object is a system for automatically solving equations of the type mentioned above.

Still another object is to determine directly the distributed capacitance of inductors.

A computer system incorporating the general features of the invention utilizes a mechanical arrangement wherein a rotatable element is driven an amount proportional to the displacement in a variable data input device and the element in turn drives a calibrated output dial through selectively actuated transmission trains for rotating a common output member for driving the dial. Different mathematical functions are performed by each of the transmission trains on data represented by the positioning of the variable device so that by successively operating the trains for different data positions of the variable device, the results of a number of mathematical operations may be accumulated and indicated directly by the dial.

As applied to solving an equation of the form:

$$A = B_1 K_1 K_2 \pm B_2 K_2 K_3 \qquad (1)$$

where $B_1$ and $B_2$ correspond to two positions of the variable device and $K_1$, $K_2$ and $K_3$ are constants, one of two transmission trains rotates the output member the constant $K_1$ times that of the element; the other train rotates the ouput gear the constant $K_3$ times that of the element and the output member drives the dial an amount equal to the constant $K_2$ times its own rotation. Starting from a zero or reference position of both the variable device and the dial, the first train is rendered operative and the variable device is moved to position $B_1$, thereby driving the dial to a position indicating $B_1 K_1 K_2$. Both trains are then disabled and the variable device is returned to the reference position and then the second train is rendered operative and the variable device is moved to position $B_2$ turning the dial an amount equal to $B_2 K_2 K_3$. The final dial setting then is the solution of the Equation 1 above.

In a preferred embodiment of the invention, as applied to the measurement of distributed capacitance of high Q inductors, a linearly variable standard capacitor in a conventional alternating current capacitance bridge is directly coupled to the rotatable element. The inductor to be tested is connected into the bridge which is normally balanced and the bridge is rebalanced at a first frequency $f_1$ by adjusting the capacitor to null the bridge while a first of two transmission trains is rendered operative. Both transmission trains are then rendered inoperative and the adjustable capacitance is returned to its normal balance position. Following this the second transmission train is rendered operative and the bridge is rebalanced at the second frequency $f_2$. At the completion of this operation the dial is automatically positioned to indicate the desired distributed capacitance directly.

These and other features of the invention will be more fully understood from the following detailed description when taken in conjunction with the accompanying drawing, in which:

The single figure of the drawing discloses a schematic diagram of a system for automatically computing distributed capacitance of a high Q inductor.

The equation for distributed capacitance of high Q inductors, which is well known in the art, is as follows:

$$C_d = \frac{K_1 C_1 - C_2}{K'_2} \qquad (2)$$

where $C_d$ is the symbol for distributed capacitance; $K_1$ is a constant equal to $$\frac{f_1^2}{f_2^2}$$

and $K'_2$ is a constant equal to $$f_2^2 - f_1^2$$

This Equation 2 is of the form of Equation 1 above where $$K_2 = \frac{1}{K'_2}, \quad K_3 = 1$$

and the sign of the second factor is negative.

The system disclosed in the drawing utilizes a conventional capacitance bridge 1, having test terminals 3 and 4 connected to opposing electrodes of a linearly variable capacitor 7. Movable electrode 8 of the capacitor is connected by means of shaft 9 to a rotatable element or gear 10 which is rotatable with the electrode 8. The bridge is energized from a source 2 and has a detector 6 for indicating a bridge balance or null.

The rotatable element 10 is part of two different gear trains for rotating an output gear 11 which, in turn, drives a calibrated dial 12. The gear ratio between the output gear 11 and the dial is equal to $1:K_2$. The first gear train includes the gears 10, 14 and 11 with a disabling clutch 15 connected between gear 14 and the output gear 11. The second gear train comprises the gears 10, 16, 17 and 11 with a disabling clutch 18 connected between gears 16 and 17. The gear ratio between element 10 and gear 14 is equal to $1:K_1$, while that between element 10 and gear 16 is equal to $1:K_3$, which, in the case disclosed for solving the Equation 2, is equal to $1:1$. The gear ratio between gears 17 and 11 is $1:1$, the gear 17 serving to reverse the direction of rotation of the output gear 11 when the second gear train is operative and thereby changes the sign of the factor resulting from the operation of this gear train, as required for Equation 2 above. The clutches 15 and 18 are energized from a direct current source 19 and a switch 29 in series therewith is provided for disabling both clutches to permit setting the dial 12 independently of the element 10 or the bridge capacitor 7. A switch 20 is also included in the clutch circuit for selectively energizing the clutches as required. In one position of the switch 20, one of the clutches is energized and the other clutch is de-energized, and vice versa for the other position.

In making a measurement of the distributed capacitance of an inductor 5 connected to the bridge test terminals 3 and 4, the dial 12 is initially set to a reference or starting "zero" position, as indicated in the drawing, and the capacitor 7 is simultaneously set to a reference setting $C_0$. For this operation, both clutches are disabled by opening switch 29 in the common energizing lead from the source 19. The $C_0$ capacitance value for capacitor 7 is the capacitance required to balance the bridge when the test terminals are open. The bridge is then energized and clutch 15 actuated by the switch 20, that is, with the switch 20 in the position shown in the drawing, and clutch 18 is de-energized and rendered inoperative. The alternating current source 2 is adjusted to apply a signal at the frequency $f_1$ to the bridge, and the electrode 8 of the capacitor 7 is rotated to produce a null in the detector 6 indicating that the inductor 5 is resonated and presents substantially infinite impedance across the electrodes of capacitor 7. This operation changes the capacitance of capacitor 7 by a value of $C_1$, the capacitance required to resonate the inductor at the frequency $f_1$. Since clutch 15 is energized for this operation, the first gear train 10, 14 and 11 causes the output dial to be turned to a position so that the indicator 28 is aligned with the dial 12 at a value $K_1C_1K_2$. The following operations are then performed in succession: switch 29 is opened and capacitor 7 is reset to the value $C_0$; switch 29 is reclosed; the output of the bridge source is changed to the second frequency $f_2$ and switch 20 is actuated so that clutch 18 is energized and clutch 15 is de-energized; and the rotatable electrode 8 of the capacitor 7 is again adjusted to produce a bridge balance thereby driving the second gear train 10, 16, 17 and 11 to rotate the output dial 12 an amount equal to "$-C_2K_2K_3$." The change from $C_0$ in the capacitance of capacitor 7 then is the capacitance required to resonate the inductor 5 at the frequency $f_2$. The final indication on the dial is equal to the first indication as produced with the first bridge balance less an amount corresponding to the second balance so that $C_d$ of Equation 2 will be indicated directly by the indicator 28.

In the event the sign ($+$ or $-$) of either factor of Equation 1 or 2 must be reversed, for example, be made different from that disclosed in the present system of the drawing, an idler gear may be interposed between element 10 and either gear 14 or 16, as required to reverse the direction of rotation of the output gear 11 thereby. In the system shown in the drawing, since it is desired to subtract the second factor $C_2K_2K_3$ from the first ($C_1K_1K_2$), the second gear train 10, 16, 17 and 11 is designed to rotate the output gear 11 in a direction opposite that resulting from the operation of the first gear train 10, 14 and 11.

It is to be understood that the above described arrangements are simply illustrative of the application of the principles of invention. Numerous other arrangements may be readily devised by those skilled in the art which will embody the principles of the invention and fall within the spirit and scope thereof.

What is claimed is:

1. A system for determining the distributed capacitance of electrical components comprising an alternating current bridge having a linearly variable nulling capacitor, means for connecting a component to be tested in parallel with the capacitor, a rotatable element, means for rotating the element an amount proportional to a displacement in the adjustable capacitor, an output dial having calibrations thereon and indicating means for the dial, a rotatable output member for rotating the dial a constant $K_2$ times its own rotation, a first transmission train for rotating the output member a constant $K_1$ times the rotation of the rotatable element, a second transmission train for rotating the output member a constant $K_3$ times the rotation of the rotatable element, and means for selectively rendering the transmission trains operable.

2. A system for determining the distributed capacitance of high Q inductors by solving the equation $C_d = C_1K_1K_2 - C_2K_2$ where $C_d$ equals the distributed capacitance; $C_1$ and $C_2$ are the values of capacitance required to resonate an inductor under test at frequencies $f_1$ and $f_2$ respectively, and $K_1$ and $K_2$ are constants corresponding to the frequencies $f_1$ and $f_2$ respectively, said system comprising an alternating current capacitance bridge with a linearly variable nulling capacitor, means for connecting a component to be tested in parallel with the capacitor, rotary means for adjusting the capacitor, an energizing source for the bridge operable at frequencies $f_1$ and $f_2$, a rotatable element, a shaft connecting the element with said rotary means for rotating the element synchronously with the rotary means, an output dial having calibrations thereon and indicating means for the dial, an output gear for rotating the dial a constant $K_2$ times its own rotation, a first gear train for rotating the output gear a constant $K_1$ times the rotation of the rotary means, a second gear train for rotating the output gear an amount equal to the rotation of the rotary means and in a direction opposite that resulting from operation of the first gear train by the rotary means, means for selectively rendering one gear train operative at a time, and means for simultaneously rendering both gear trains inoperative.

3. A system for determining the distributed capacitance of an inductor by solving the equation $C_d = C_1K_1K_2 - C_2K_2$ where $C_d$ equals the geometrical capacitance; $C_1$ and $C_2$ are the values of capacitance required to resonate an inductor under test at frequencies $f_1$ and $f_2$ respectively, and $K_1$ and $K_2$ are constants corresponding to the frequencies $f_1$ and $f_2$ respectively, said system comprising an alternating current capacitance bridge with a linearly variable nulling capacitor, means for connecting a component to be tested in another branch, rotary means for adjusting the capacitor, a rotatable element, a shaft connecting the element with the rotary means for rotating the element synchronously with the rotary means, an output dial having calibrations thereon and indicating means for the dial, an output gear for rotating the dial a constant $K_2$ times its own rotation, a first gear train for rotating the output gear a constant $K_1$ times and in the opposite direction of the rotation of the rotatable element, a second gear train for rotating the output gear an amount equal to and in the same direction as the rotatable element, a clutch in each of the gear trains, means for selectively actuating one and de-actuating the other of the clutches, and means for simultaneously disabling both clutches.

References Cited in the file of this patent

UNITED STATES PATENTS

| | | |
|---|---|---|
| 1,653,462 | Jenny | Dec. 20, 1927 |
| 2,380,846 | Josepho | July 31, 1945 |
| 2,468,334 | Kennedy | Apr. 26, 1949 |
| 2,607,828 | Razek | Aug. 19, 1952 |
| 2,716,520 | Kellogg et al. | Aug. 30, 1955 |